(12) United States Patent
Yuen (10) Patent No.: US 8,646,543 B2
(45) Date of Patent: Feb. 11, 2014

(54) LOCKOUT SYSTEM FOR HYDRAULIC VALVES OF AN AGRICULTURAL IMPLEMENT

(75) Inventor: Cory Adrian Yuen, Martensville (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 287 days.

(21) Appl. No.: 12/789,688

(22) Filed: May 28, 2010

(65) Prior Publication Data

US 2011/0290516 A1    Dec. 1, 2011

(51) Int. Cl.
*A01B 63/00* (2006.01)

(52) U.S. Cl.
USPC .......................................... 172/482; 172/311

(58) Field of Classification Search
USPC ..................... 172/311, 452, 456, 481, 482
See application file for complete search history.

(56) References Cited

U.S. PATENT DOCUMENTS

| | | | | |
|---|---|---|---|---|
| 1,927,458 A | * | 9/1933 | Klise | 172/456 |
| 2,209,029 A | * | 7/1940 | Kriegbaum et al. | 172/274 |
| 2,715,286 A | | 8/1955 | Saveson | |
| 3,321,028 A | * | 5/1967 | Groenke | 172/311 |
| 3,322,438 A | * | 5/1967 | Cooley | 280/412 |
| 3,362,483 A | * | 1/1968 | Twidale | 172/311 |
| 3,460,631 A | * | 8/1969 | Friesen et al. | 172/311 |
| 3,470,965 A | * | 10/1969 | Quickstad | 172/311 |
| 3,477,518 A | * | 11/1969 | Walker et al. | 172/311 |
| 3,811,516 A | * | 5/1974 | Thompson et al. | 172/311 |
| 3,957,123 A | | 5/1976 | Federspiel | |
| 3,967,684 A | | 7/1976 | Haverdink | |
| 4,024,974 A | | 5/1977 | Hodge | |
| 4,074,766 A | | 2/1978 | Orthman | |
| 4,534,416 A | | 8/1985 | Johnson | |
| 5,042,587 A | | 8/1991 | Halfmann | |
| 5,303,779 A | * | 4/1994 | Friggstad | 172/311 |
| 5,449,042 A | * | 9/1995 | Landphair et al. | 172/456 |
| 6,012,648 A | | 1/2000 | Morris | |
| 6,679,339 B1 | * | 1/2004 | Steinlage et al. | 172/395 |
| 7,204,319 B2 | * | 4/2007 | Hoehn et al. | 172/482 |
| 7,431,221 B2 | | 10/2008 | Thomson et al. | |

FOREIGN PATENT DOCUMENTS

GB    2057831    4/1981
JP    2007143468    6/2007

* cited by examiner

*Primary Examiner* — Thomas B Will
*Assistant Examiner* — Joel F. Mitchell
(74) *Attorney, Agent, or Firm* — Rebecca L. Henkel (57) ABSTRACT

A farm implement has a frame that is foldable between an extended, working position and a folded, for-transport position has a hydraulic system that controls the flow of hydraulic fluid to a series of actuators that raise and lower the implement. The hydraulic system is controlled by a control lever or arm that rotates a rockshaft to open and close hydraulic valves to change the flow of hydraulic fluid to the actuators. To prevent the unintentional lowering of the implement frame when the implement is in transport, a lockout arrangement engages the rockshaft to prevent rotation of the rockshaft when the frame is in the folded position. The lockout arrangement locks out the rockshaft automatically when the frame is raised to the folded position.

14 Claims, 12 Drawing Sheets

LOCKOUT SYSTEM FOR HYDRAULIC VALVES OF AN AGRICULTURAL IMPLEMENT

BACKGROUND OF THE INVENTION

The present invention relates generally to farm implements and, more particularly, to a lockout system for hydraulic valves of an agricultural implement, such as a hoe drill, to prevent unintentional lowering of ground engaging tools of the hoe drill when the drill is in, or is being transitioned to, a folded, transport position.

Modern farmers strive to improve the management of the increasing amounts of farm acres. Improving management requires farmers to be able to quickly prepare the soil and plant seed each season. This haste has driven the need for more efficient and larger agricultural machinery.

Implements such as harrows, packers, or combined harrow-packers are being made with widths exceeding sixty feet in the field operating position. Also, drill implements employed to distribute seed product across an agricultural field are also being made increasingly wider in the field operating position. Wider working widths provide more efficient field working by increasing the number of rows that are seeded in a single pass or by increasing the amount of field that is tilled in a single pass. However, as agricultural implements have been made increasingly wider, there has been a need for systems to compactly fold the implement for practical and safe transport over highways and through gates, and for greater maneuverability.

An implement, such as a hoe drill, will typically be hydraulically folded between the extended, field working position and the narrow transport position. The hydraulic system generally consists of hydraulic actuators and valves that control the flow of hydraulic fluid in the actuators. The valves are commonly mechanically coupled to control levers that can be manually actuated by an operator.

To fold the implement from the extended, field working position to the narrow transport position, the operator moves a two-position control lever of the implement to a transport position which in turn changes the hydraulic valves for the implement to a transport position or setting. Thus, when the hydraulic system for the implement is activated, such as by a hydraulic remote in the operator cab of the prime mover, the implement will fold to the transport position. Similarly, to unfold the implement, the hydraulic system is activated to unfold the implement. However, the ground openers mounted to the frame of the implement cannot be lowered into a ground engaging position until the control lever is moved to the field position or setting. When the control lever is in the field position, the implement frame is free to pivot about a transverse axis to respond to changes in terrain contour as the implement is being towed along the field. An undesirable condition can occur however if the implement is in transition to, or already in, the transport position and the valves are switched to the field setting. That is, the implement could pivot about the transverse axis and lower without any control.

SUMMARY OF THE INVENTION

The present invention is directed to lockout arrangement that prevents the hydraulic valves that allow the agricultural implement to respond to terrain changes from moving to a field or working position when the implement is in a transport position.

In accordance with one aspect of the invention, a lockout arrangement for a foldable agricultural implement is provided. The lockout arrangement includes an elongated member having a first end and a second end, a coupler for coupling the first end of the elongated member to a frame member of the agricultural implement that rotates when the agricultural implement is moved between an unfolded, working position and a folded, transport position, and a pin attached at the second end of the elongated member. The pin is configured to removably engage a rotating member of the agricultural implement, and prevents rotation of the rotating member when engaged with the rotating member. When the pin is not engaged with the rotating member, the rotating member is free to rotate, which allows the implement frame to oscillate in response to changes in ground contours.

In accordance with another aspect of the invention, an agricultural implement has a frame having at least two frame sections foldable between an extended position and folded position. A plurality of ground engaging tools is mounted to the frame sections, and a hydraulic system is operative to fold and unfold the frame sections. A rockshaft is pivotably coupled to the frame and allows the hydraulic system to lower the ground engaging tools to a ground engaging position. A lockout prevents rotation of the rockshaft when the frame sections are in the folded position.

According to another aspect of the invention, a method for preventing unintentionally lowering of the frame of a foldable farm implement when the implement is in a folded, transport position is provided. The method includes translating a locking member with rotation of the frame from an unfolded position to the folded, transport position and engaging the locking member with a rockshaft coupled to the frame when the frame is in the folded, transport position, wherein the rockshaft, when rotated, allows a plurality of row units mounted to the implement to pivot about an axis that is transverse to a longitudinal axis of the implement. The method further includes maintaining the engagement of the locking rod with the frame until the frame is placed in the unfolded position.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
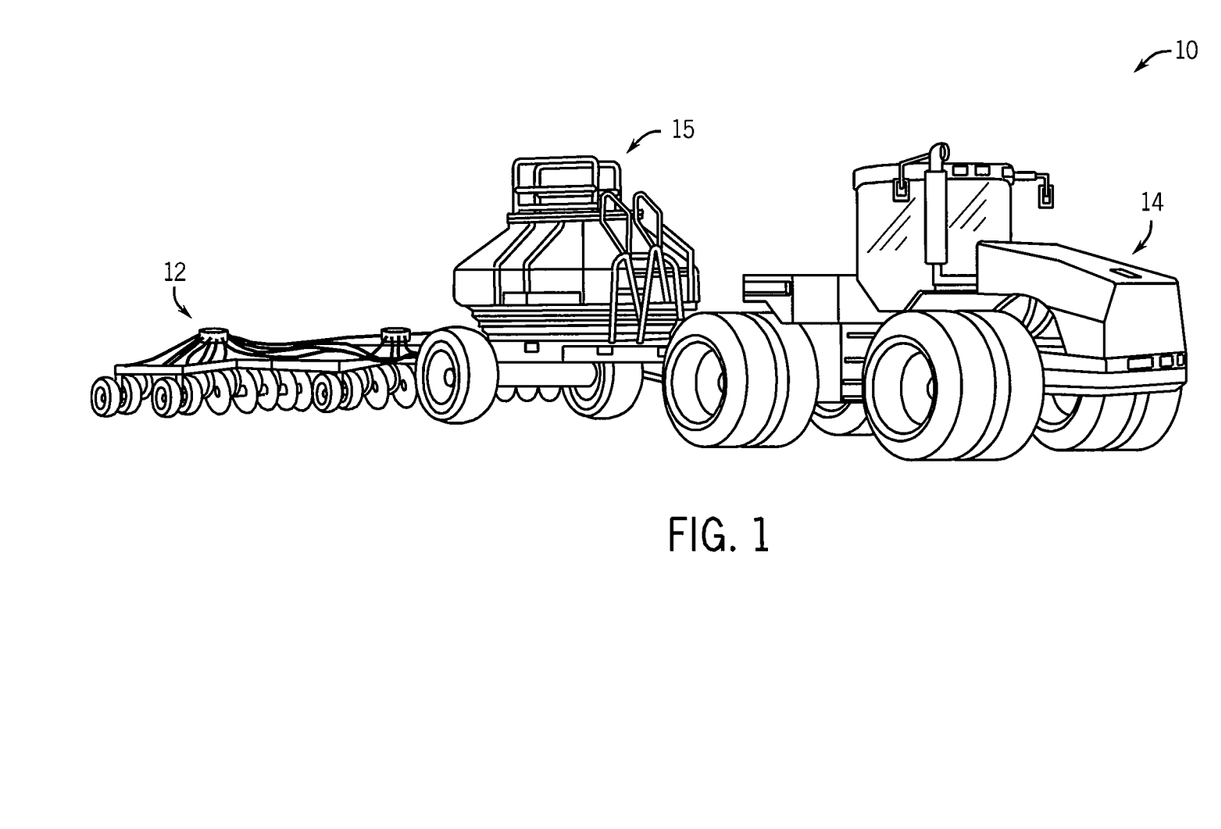
FIG. 1 is a pictorial view of a farm planting system having a farm implement hitched to a prime mover.

Referring now to FIG. 1, a planting system 10 according to one embodiment of the invention includes a foldable implement 12, shown in a field working position, coupled to a prime mover 14, e.g., tractor, in a known manner. The planting system 10 may also include an air cart 15, as known in the art. While the invention is applicable with different types of foldable implements, for purposes of illustration, the invention will be described with respect to a hoe drill.

Figure 2:
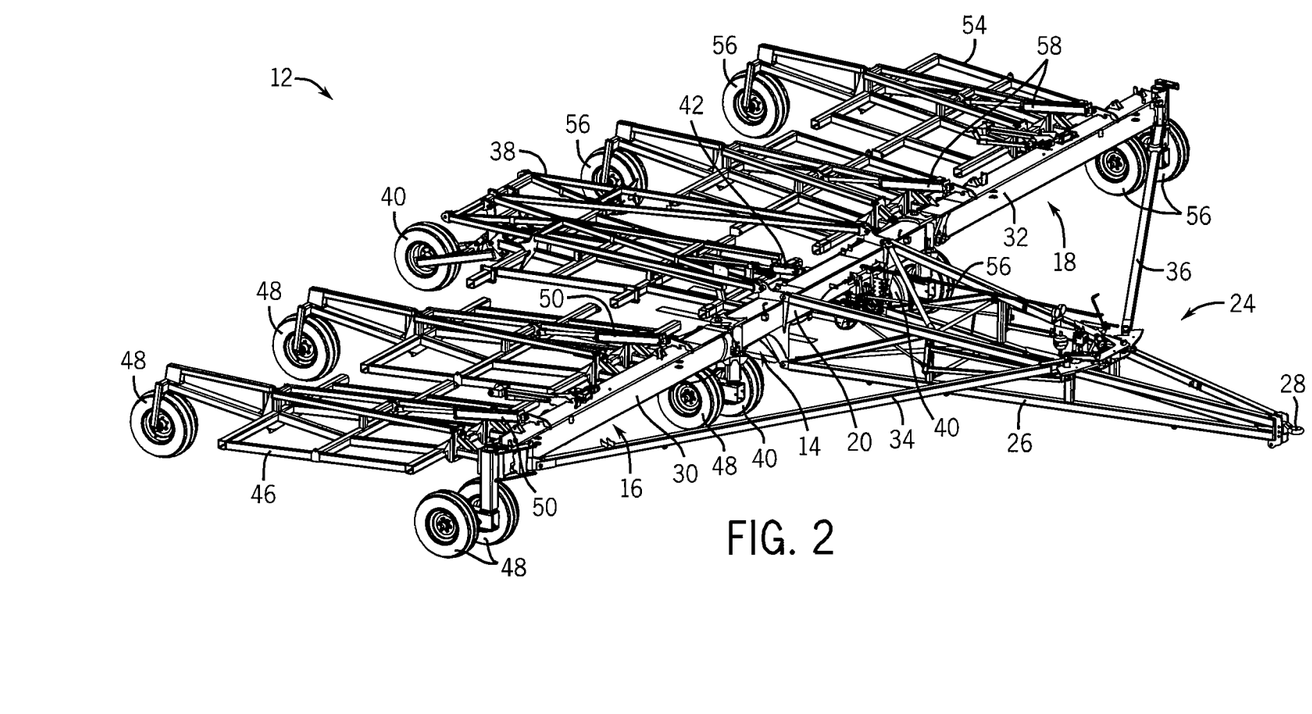
FIG. 2 is a top isometric view of a hoe drill in an unfolded, working position for use with the farm planting system of FIG. 1, and shown without ground engaging tools.
Figure 3:
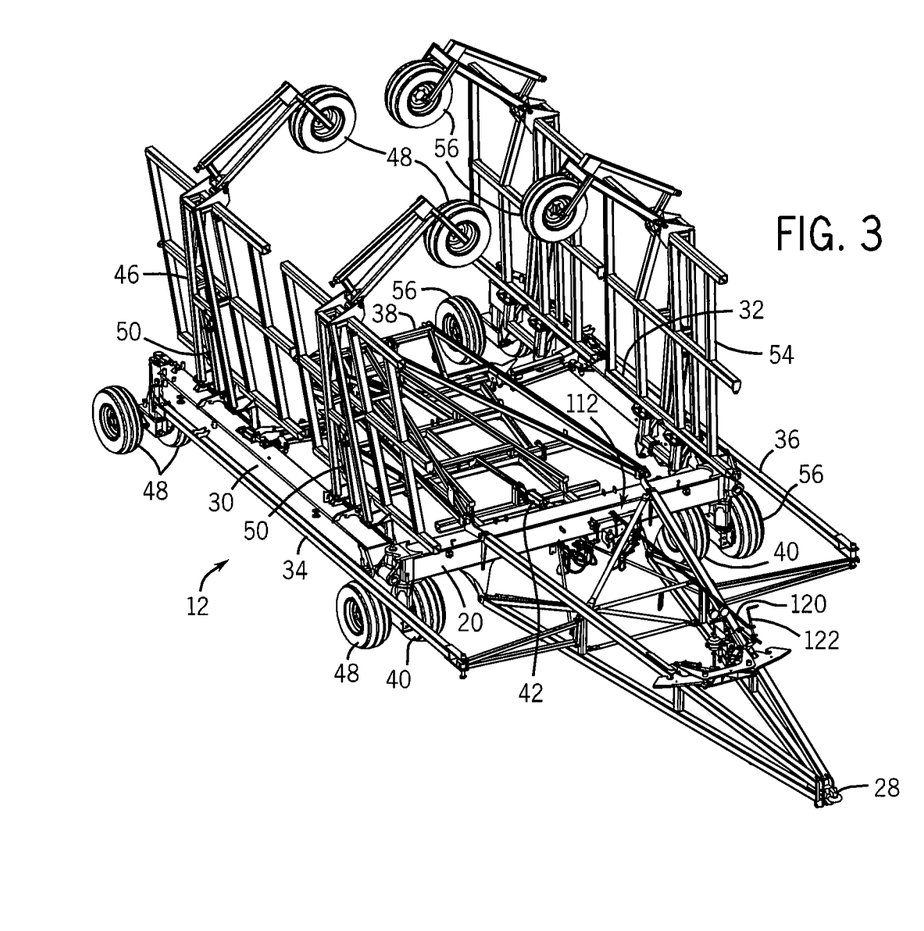
FIG. 3 is an isometric view of the hoe drill in a folded, transport position.

Referring now to FIG. 2, hoe drill 12 has a center frame section 14 and two wing sections 16, 18 pivotally mounted to opposite lateral sides of the center frame section 14. The wing sections 16, 18 are designed to be folded to a transport position in which the wing sections 16, 18 are folded over the center frame section 14 to provide a narrow transport configuration that is suited for transport between crops, fields, and along roadways, as well as storage. FIG. 3 shows the hoe drill 12 in the folded, transport position.

The center frame section 14 has a tool bar 20 to which a tongue section 24 is coupled. The tongue section 24 generally consists of a cage 26 having a distal end coupled to the tool bar 20 and a proximate end forming a hitch point 28 for coupling to the prime mover 14 in a conventional manner. Wing sections 16, 18 have respective booms 30, 32 and draft links 34, 36 are interconnected between the cage 26 and booms 30, 32, respectively. The draft links 34, 36 are pivotally connected to the cage 26 and the wing booms 30, 32 so that as the wing booms 30, 32 are drawn inwardly, the draft links 34, 36 are drawn to a folded position, as shown in FIG. 3.

A center sub-frame 38 is pivotally mounted to the center tool bar 20 and is supported above a field surface by wheel 40. Ground engaging tools (not shown), such as disc openers, may be mounted to the center sub-frame 38 in a known manner. With additional reference to FIG. 4, a downforce cylinder 42 is interconnected between the center tool bar 20 and the center-sub-frame 38. When appropriately activated, the hydraulic cylinder 42 provides a tendency to rotate the center sub-frame 30 about pivot connections 44 to apply a downforce on the sub-frame 38.

Referring again to FIGS. 2 and 4, wing section 16 has a right-hand side sub-frame 46 that is pivotally coupled to the wing boom 30, and is supported above the field surface by wheels 48. Ground engaging tools (not shown) are attached to the sub-frame 46 in a known manner. Interconnected between the wing boom 30 and the sub-frame 46 are lift cylinders 50, and when appropriate actuated, pivot the sub-frame 46 about pivot connections 52 to position the sub-frame generally over wing boom 30. Cylinders 50 also apply a downforce on the sub-frame 46 to lower the openers into engagement with the ground.

Figure 4:
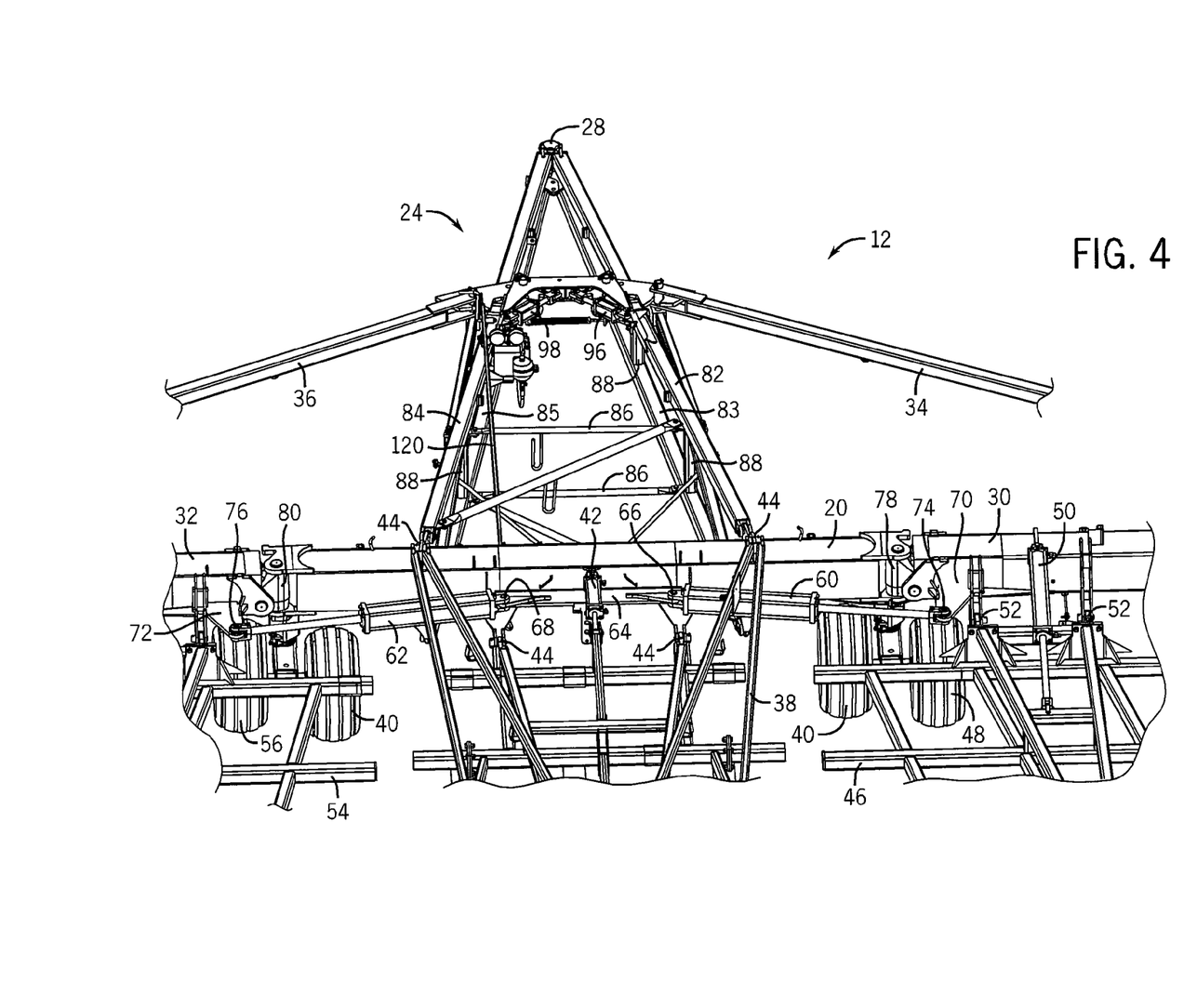
FIG. 4 is a rear isometric view of a front portion of the hoe drill.

In a similar manner, wing section 18 has a left-hand side sub-frame 54 that is pivotally coupled to the wing boom 32, and is supported above the field surface by wheels 56. Ground engaging tools (not shown) are attached to the sub-frame 54 in a conventional manner. Interconnected between the wing boom 32 and the sub-frame 54 are lift cylinders 58 that when actuated, pivot the sub-frame 54 about pivot connections (not shown) to raise the sub-frame 54 over wing boom 32. Cylinders 58 also apply a downforce on the sub-frame 54 to lower the openers into engagement with the ground.

As best shown in FIG. 4, the hoe drill 12 also includes a right-hand side folding cylinder 60 and a left-hand side folding cylinder 62. The cylinders 60, 62 are interconnected between the wing booms 30, 32 and center tool bar 20, respectively. More particularly, a mounting flange 64 is formed on the rear surface of the center tool bar 20 and inward ends of the cylinders 60, 62 are pivotally coupled to the mounting flange at pivot points 66, 68, respectively. Outward ends of the cylinders 60, 62 are pivotally coupled to mounting flanges 70, 72, respectively, attached to wing booms 30, 32, respectively, at pivot points 74, 76, respectively. When the cylinders 60, 62 are appropriately actuated, the cylinders 60, 62 pull the wing booms 30, 32 inwardly (rearward) so that the wing booms 30, 32 rotate about knuckles 78, 80 at opposite ends of the center tool bar 20, respectively.

Figure 5:
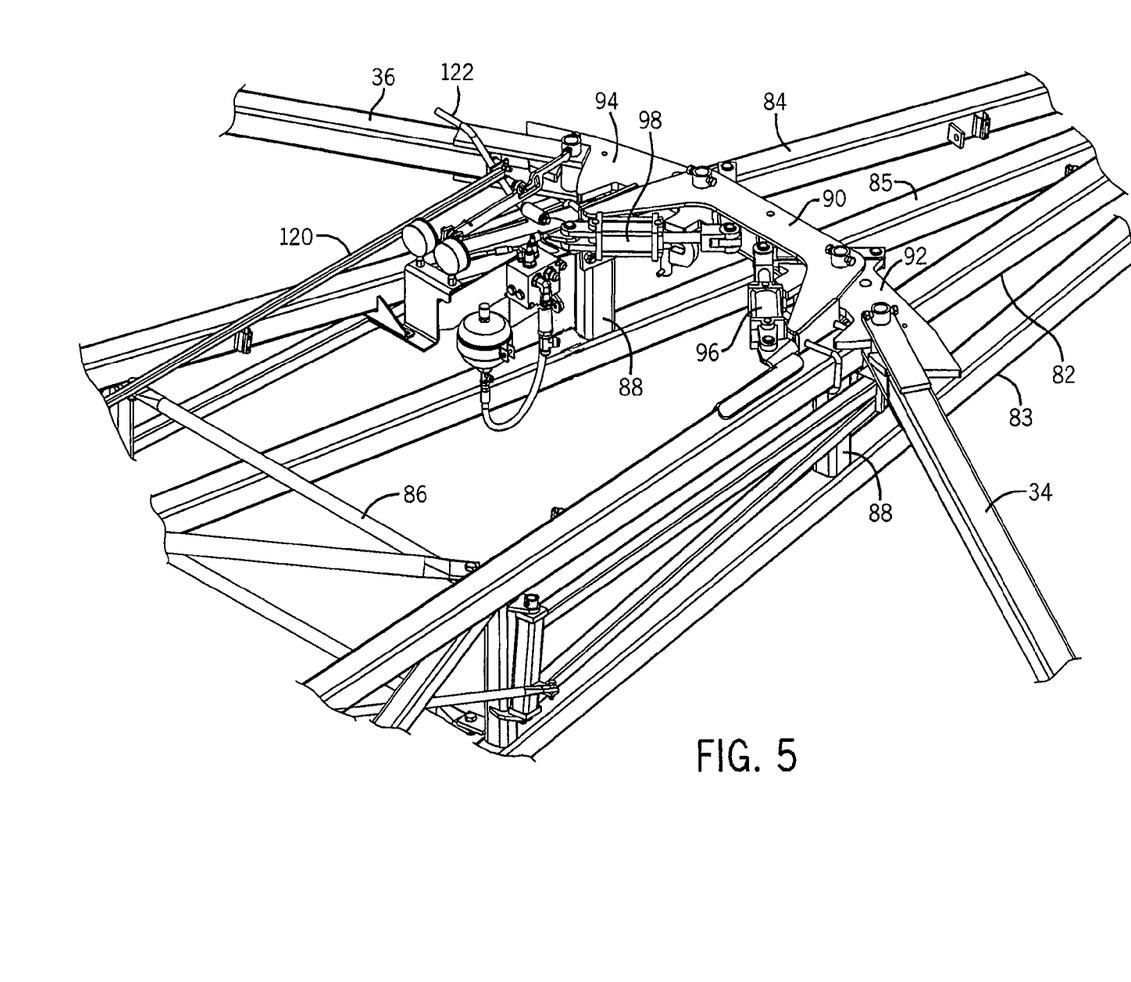
FIG. 5 is an enlarged view of the front portion of the hoe drill.

Now referring to FIG. 4, the cage 26 is formed by two pairs of stacked rails 82, 83, 84, and 85 interconnected between center tool bar 20 and hitch point 28. The stacked rails 82, 83, 84, and 85 are angled inwardly from their connection with the tool bar 20 to the hitch point 28 so that the cage 26 has a generally triangular form. The cage 26 also includes a number of cross-bars 86 and posts 88 providing support for the stacked rails 82, 83, 84, and 85. As best shown in FIG. 5, the cage 26 includes a swing mount 90 that is interconnected between the pair of stacked rails. A pair of links 92, 94 are pivotally coupled to the swing mount 90 and hook around forward ends of the arms 34, 36. Swing cylinders 96, 98 are interconnected between the links 92, 94, respectively, and upper rails 82 and 84, respectively. Thus, when the cylinders 96, 98 are actuated, the links 92, 94 are rotated so as to open and release arms 34, 36 allowing the arms 34, 36 to follow the wing sections 16, 18 as they pivot about knuckles 78, 80. The flow of hydraulic fluid to cylinders 96, 98 is controlled by V4 and V8.

Figure 6:
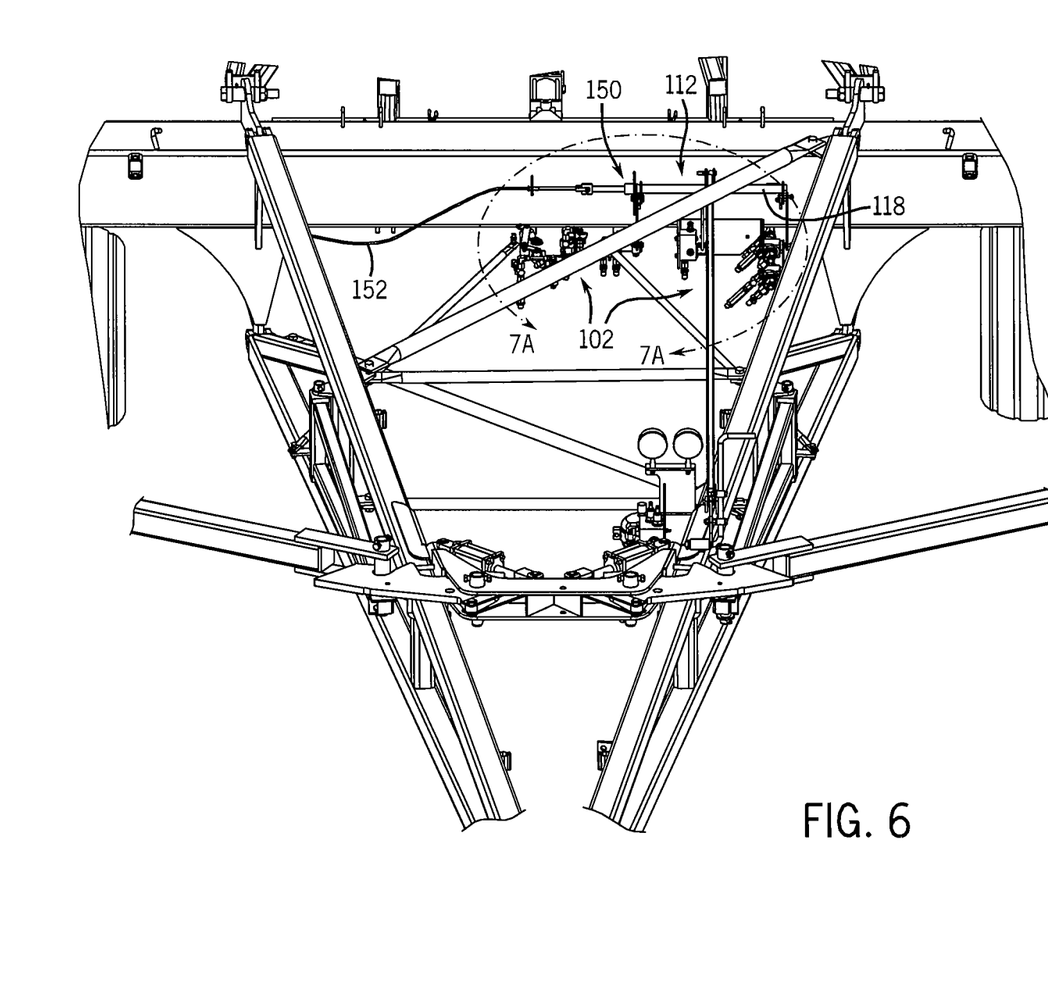
FIG. 6 is a front isometric view of a center section of the hoe drill.
Figure 7A:
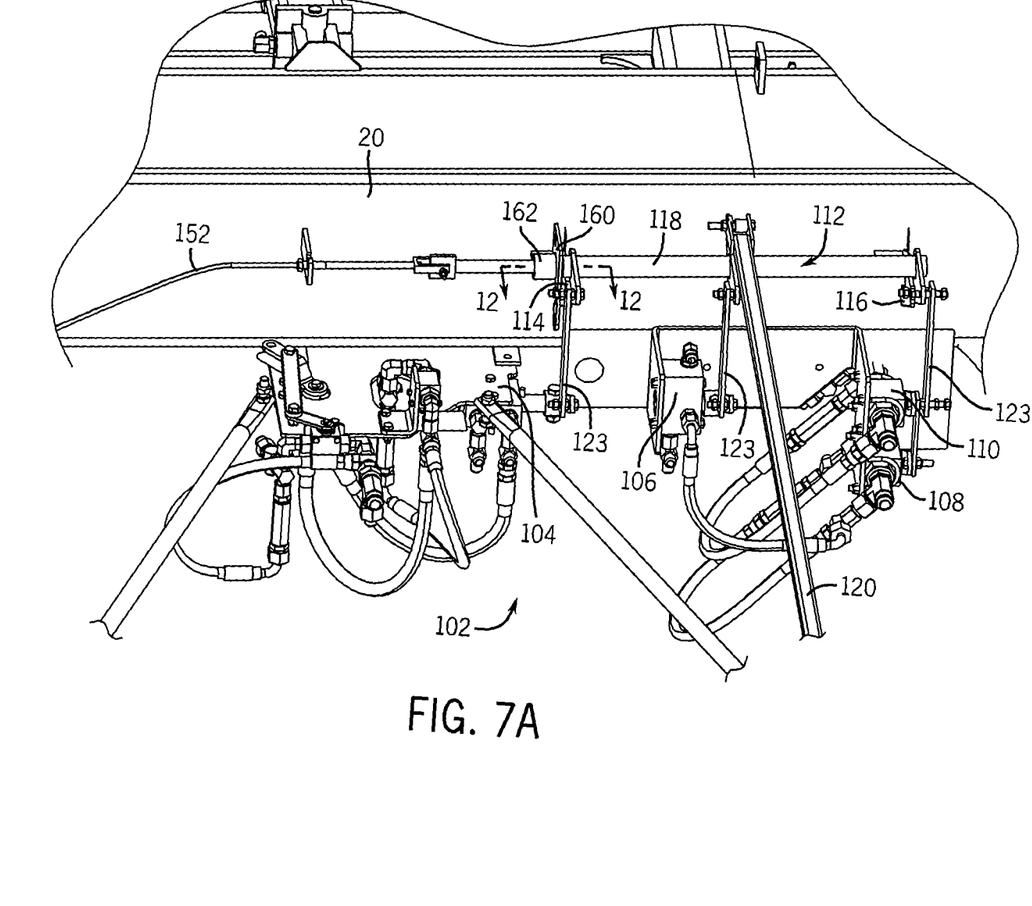
FIGS. 7A and 7B are isometric views of a valve lockout arrangement according to one aspect of the present invention.

As shown in FIG. 6, a series of valve bodies, generally designated by reference numeral 102, control the flow of hydraulic fluid to cylinders 42, 50, 58, 60, and 62. The valve bodies 102 are mounted to respective mounting brackets (not numbered) that are in turn are attached to, or integrally formed with, the center tool bar 20. In this regard, the valve bodies 102 are positioned forward of the center tool bar 20. For the sake of simplicity, the conduits interconnecting the valve bodies 102 and the cylinders 42, 50, 58, 60, and 62 are not shown, but it is understood that the fluid connection between the valve bodies and the cylinders via such fluid conduits to be within the skill of one in the art. As best shown in FIG. 7A, the valve bodies 102 include valve bodies 104, 106, 108, and 110 which are mechanically linked to a rockshaft 112 which is mounted to the center tool bar 20 by a pair of mounting flanges 114, 116. Operation of the valves 104-110 will be described with respect to the schematic of FIG. 8. The rockshaft 112 has a tubular body 118 to which a control link 120 is coupled. The control link 120 has a handle 122, FIG. 5, which enables an operator to remotely rotate the rockshaft 112. When the rockshaft 112 is rotated, the valves within valve bodies 104, 106, 108, and 110 are switched. That is, the valve bodies 104, 106, 108, and 110 are mechanically coupled to the rockshaft 112 by linkages 123.

Figure 8:
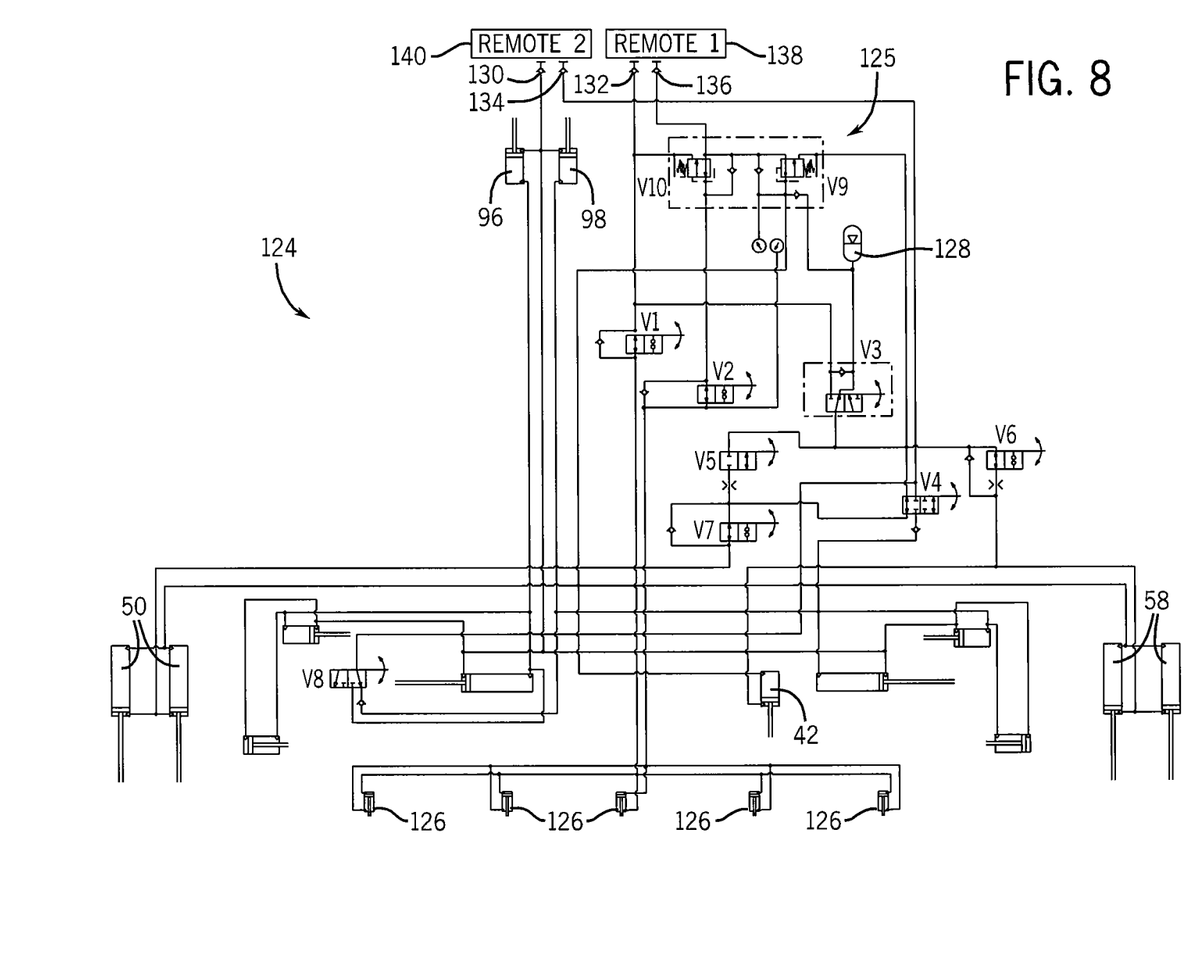
FIG. 8 is a schematic representation of a first preferred hydraulic control system for the hoe drill.

FIG. 8 is schematic of the hydraulic circuit for controlling raising and lowering and folding and unfolding of the hoe drill 12. The circuit 124 includes a set of pressure reducing/ relieving valves 125 that control the hydraulic pressure on the base end of the tool frame cylinders 42, 50, and 58, and the opener cylinders 126. Valves V1, V2, V3, and V4 are contained within valve bodies 108, 110, 106, and 104, respectively. Valves V1, V2 are used to lock out the opener cylinders when the drill 12 is not in the working (field) position. In this regard, when valves V1, V2 are closed the openers cannot be lowered. Valve V3 is in the left position when the machine is in the working position. This is required to allow hydraulic fluid to return from the rod end to the base of the tool frame cylinder 42, 50, 58, and so fluid can return to accumulator 128. Valve V4 allows fluid to pass to and from the hydraulic system (not shown) of the prime mover, e.g., tractor. It will thus be appreciated that the hydraulic circuit 124 has a pair of supply ports 130, 132 and return ports 134, 136.

In the embodiment illustrated in FIG. 8, the hydraulic circuit 124 includes two sub-circuits. A frame circuit for controlling the sequencing of the folding and unfolding of the drill as well as raising and lowering the openers, and a swing circuit for controlling swinging the wing booms inward to the transport position and outward to the working position. Each sub-circuit is activated by separate remote controls 138 and 140.

In this regard, when the operator desires to fold the implement, the operator moves the control lever 120 to the transport position, which results in rotation of the rockshaft. With rotation of the rockshaft, valves V1, V2 are moved to the closed position, valve V3 is in the right hand position, and valve V4 is in the right hand position. Then using the remote control, the operator can commence folding of the drill. More particularly, the right-hand side of the drill is first raised by activating remote 138. The operator can swing the right-hand side wing boom 16 inward using remote control 140. This causes V5 to open, and V6 to close. The left-hand side of the drill may now be rotated upward so that the left-hand side sub-frame is rotated over wing boom 18. This moves V8 to the left position. Wing boom 18 may then be swung inward to place the drill in the transport position shown in FIG. 3. Because valves V6 and V7 are one-way blocking (check) valves when closed, pressure can be supplied to the rod end. This allows the operator to raise the sub-frames if they have lowered due to internal valve leakage.

One skilled in the art will appreciate that to unfold the drill 12 from the transport position to the working position, the operator again uses remote control 138 to commence the unfolding process. First, the left wing boom is pivoted outwardly to the extended position. Thereafter, the left sub-frame, right wing boom, and then right sub-frame are extended and lowered to the position shown in FIG. 2. The operator then moves the control lever 120 to the working setting. This causes rotation of the rockshaft, which in turn causes valves V1 and V2 to open to extend the opener cylinders for lowering the openers into engagement with the ground. Valve V3 is also moved to the open position which allows the sub-frames to move in response to changes in ground contours. Valve V4 is moved to the closed position.

It will be appreciated that the hydraulic circuit 124 provides a controlled sequencing of the folding and unfolding of the drill 12 using a network of shut-off and sequencing valves that are mechanically linked to open and close in a prescribed order. It will further be appreciated that the circuit 124 also permits one hydraulic remote, e.g., remote 138, to be used to control the weight transfer for the sub-frames, ground engaging tool tip force and packing force, in addition to raising and lowering of the sub-frames. More particularly, the pressure control valves include valves V9 and V10 that allow the frame weight transfer and opener tip force to be set at different levels.

Using one remote control for weight transfer and tip and packing force provides a timing benefit. That is, when the openers are lowered and engaged in the ground, weight transfer to the frames should be applied. On the other hand, when the openers are in the raised position, weight transfer should be removed to reduce stress on the sub-frames. By using a single remote, this application and reduction of weight transfer will always occur. Additionally, when folding into the transport position, the openers will be raised fully off the ground before the sub-frames are lifted off the ground. Thus, the possibility of the operator forgetting to raise the openers before transport is avoided. As a result, the circuit 124 ensures that no openers are too low before the drill is folded to the transport position.

In other words, utilizing a single control for the pressure relief sub-circuit and the shut-off/sequencing sub-circuit provides: (1) no weight transfer to the sub-frames will occur until the openers are lowered; (2) all weight transfer to the sub-frames will be removed before the openers are raised; (3) openers will be raised before the sub-frames are raised; and (4) the sub-frames will be lowered before the openers are lowered into ground engagement.

Figure 9:
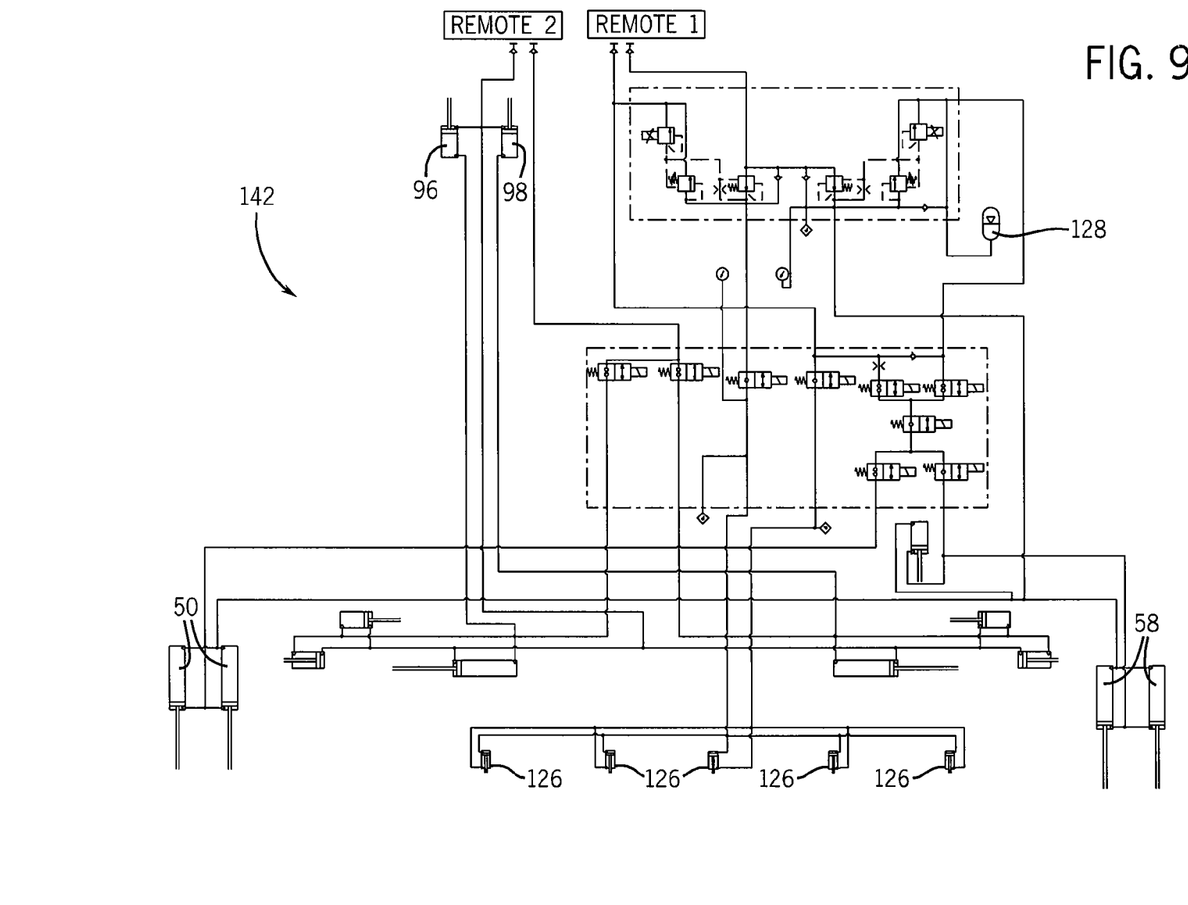
FIG. 9 is a schematic representation of a second preferred hydraulic control system for the hoe drill.

FIG. 9 is a schematic layout of another preferred hydraulic circuit for use with the drill shown in FIG. 2. In this embodiment, the circuit 142 is substantially similar to circuit 124 described above, but utilizes solenoid controlled valves rather than mechanically actuated valves to control the raising and lowering and folding and unfolding of the drill.

Figure 10:
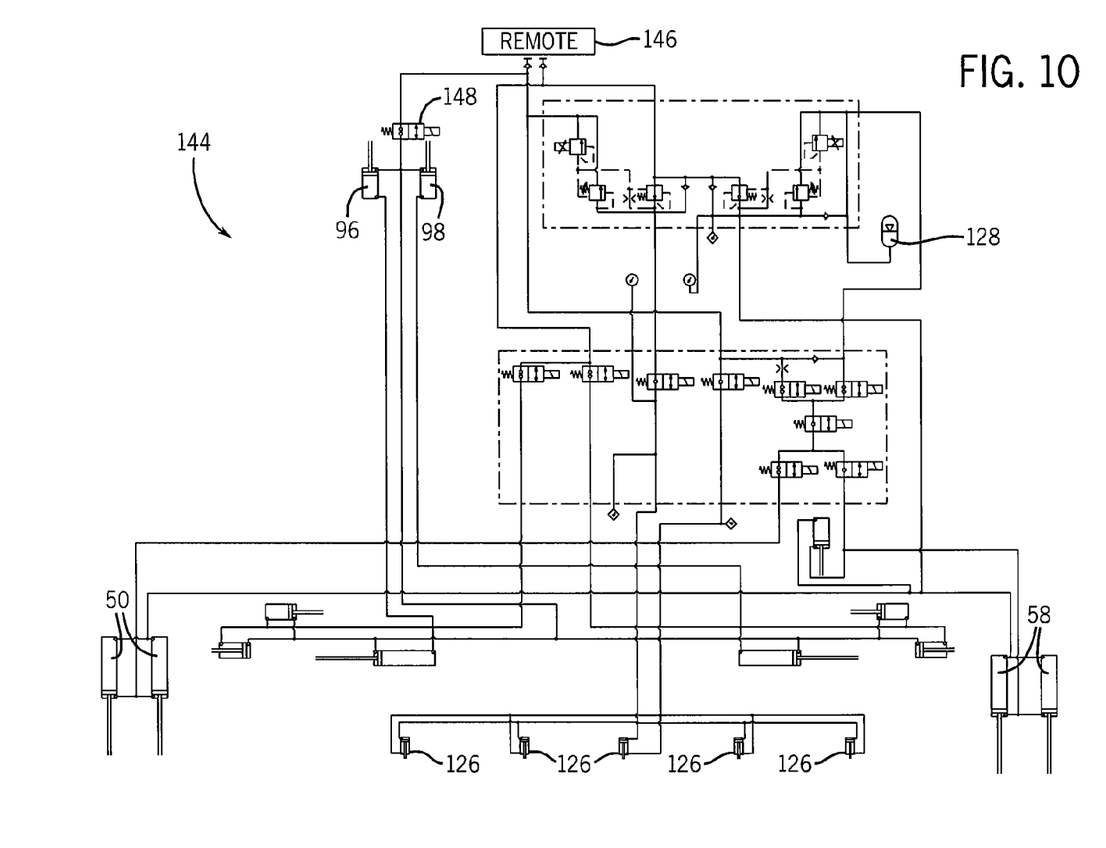
FIG. 10 is a schematic representation of a third preferred hydraulic control system for the hoe drill.

FIG. 10 shows yet another schematic layout of a preferred hydraulic circuit 144 according to another aspect of the invention. In this embodiment, which for purposes of illustration has a layout similar to the circuit of FIG. 9, the swing circuit and the frame circuit are on the same remote 146. Thus, in this embodiment, a single hydraulic remote control may be used to control raising and lowering of the openers, raising and lowering of the sub-frames, and swinging in and out the wing booms. Circuit 144 includes ON/OFF valve 148 to activate/deactivate the swing sub-circuit.

Figure 7B:
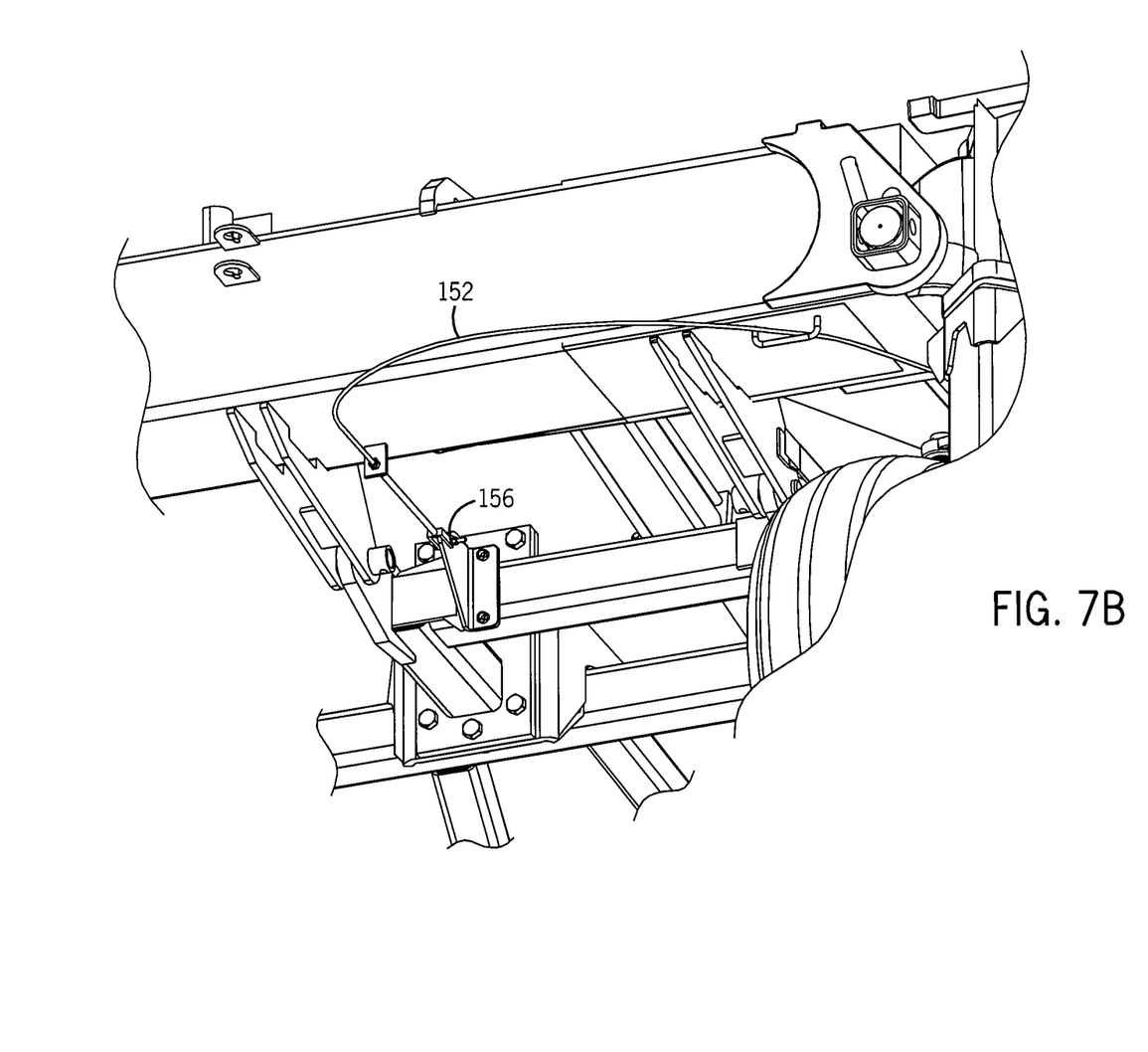

As described above, one of the drawbacks of conventional foldable implements is the possibility that the implement frame could be unintentionally lowered while in the transport position. If the valves are switched to the field setting while the implement is transitioning, or is already in, the transport position, the implement frame could be free to pivot and lower without control. To prevent such an occurrence, the present invention provides a lockout arrangement 150, which is best illustrated in FIGS. 7A and 7B.

The lockout arrangement 150 generally consists of a push-pull cable 152 and a sliding pin 154. The sliding pin 154 is attached to an end of the push-pull cable 152 adjacent the rockshaft 112. The opposite end of the push-pull cable 152 is attached, at point 156, to one of the wing sections, such as sub-frame 46.

Alternately, the push-pull cable 152 could be attached to sub-frame 54. In either case, when the implement is in the field position, e.g., the wing sections 16, 18 are unfolded and all sub-frames are lowered, such as illustrated in FIG. 2, the center tool bar and the wing booms are generally parallel to the ground and is free to rotate approximately 15 degrees away from or toward the ground to account for changes in ground contours, field obstructions, and the like. When the operator desires to place the implement in its transport position, the operator activates control lever 120 which causes rotation of the rockshaft 112. As the rockshaft 112 rotates, the positions of the valves 104-110 change, as described above. In one preferred embodiment, after the control lever has been activated to change the valves to the "transport" setting, the operator activates the remote control that causes the right-hand side sub-frame to rotate over the wing boom 30 followed by swinging in of the wing boom 30

Figure 11:
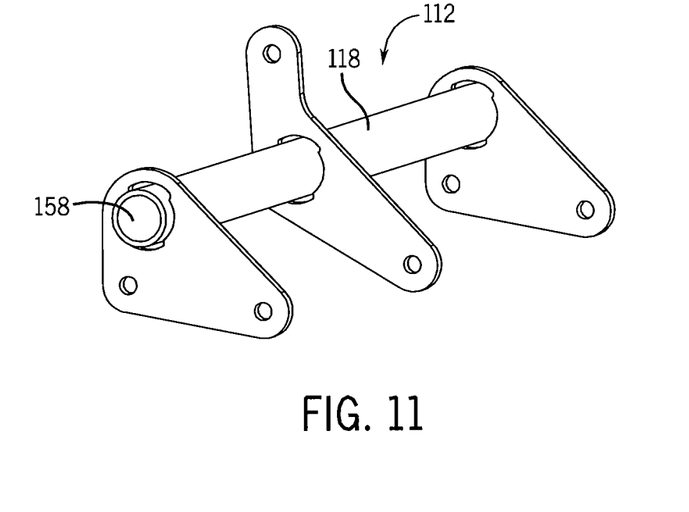
FIG. 11 is an isometric view of a valve-actuating rockshaft of the drill shown in FIG. 2.
Figure 12:
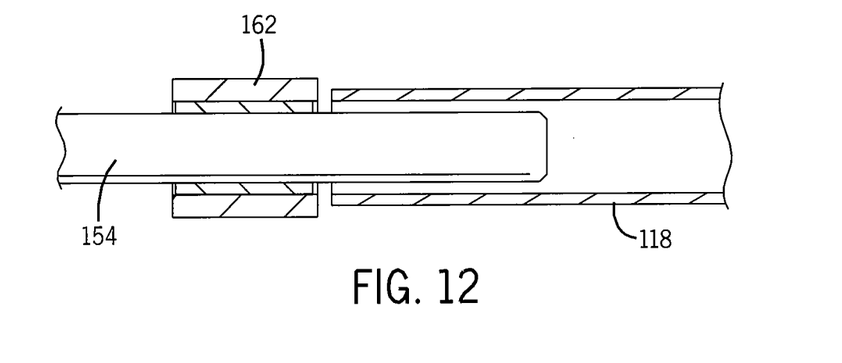
FIG. 12 is a section view taken along line 12-12 of FIG. 7A.

As sub-frame 46 is rotated, the lockout arrangement 150 of the present is activated. More particularly, as sub-frame 46 rotates over tool bar 30, the attached end of the push-pull cable 152 pushes the cable inward, i.e., toward the rockshaft 112. With continued rotation of the sub-frame, the pin 154 moves toward a bore 158, FIG. 11, formed in an end of the rockshaft 112. When the sub-frame 46 has reached its fully rotated position, the pin 154 will slide into the rockshaft 112 thereby preventing rotation of the rockshaft 112. As a result, if the control lever 120 were to be activated while the implement is folding or has been folded, the rockshaft 112 will not be allowed to rotate. Since the rockshaft 112 is prevented from rotating, the valves controlled by rotation of the rockshaft 112 cannot change positions. Most importantly, since valves V1 and V2 are closed when the rockshaft 112 rotated by movement of the control lever 120 to the transport setting, locking out rotation of the rockshaft 112 prevents unintentional movement of the rockshaft 112 to the "working" setting via movement of the control lever 120. Since hydraulic fluid cannot flow, the implement cannot rotate or pivot as may otherwise occur without the lockout arrangement 150 of the present invention. When the implement is unfolded, the pin 154 will automatically be withdrawn from the rockshaft 112 which allows the rockshaft 112 to rotate when the control lever is moved to the "working position".

The lockout arrangement 150 includes a flange 160 mounted to the tool bar 20 and adjacent to the bore 158 formed in the end of the rockshaft 112. The flange 160 carries a bushing 162 that aligns with bore 158 when the rockshaft 112 is rotated to the transport position. The pin 154 slides within bushing 162 as the wing section 16 is folded. As described above, when fully folded, the pin 154 will slide through the bushing 162 into the bore 158 of the rockshaft 112. Since the bushing 162 is mounted to the flange 160, which is fixedly attached to the tool bar 20, rotation of the rockshaft 112 will be prevented when pin 154 is positioned within the bore 158.

It will be appreciated that the present invention provides a hydraulic circuit for use with a farm implement, such as a hoe drill, which provides a number of performance benefits over conventional hydraulic circuits or systems. The hydraulic circuit is arranged and configured to sequence the raising and lowering and folding and unfolding of the implement in a predefined, orderly manner. Weight transfer to the frames of the implement, opener tip force and packing force, and raising/lowering of the frames and transitioning between field and transport position can be controlled using a single remote. Using a single remote also provides a preferred sequencing of the application/removal of weight to the frames and raising/lowering of the implement. In one embodiment, a single remote control can be used to control both a frame lowering/raising circuit and a boom swing circuit. Further, according to another aspect of the invention, a valve lockout arrangement is provided to prevent the flow of hydraulic fluid to the cylinders that raise and lower the openers when the implement is in, or being transitioned to, the transport position.

Many changes and modifications could be made to the invention without departing from the spirit thereof. The scope of these changes will become apparent from the appended claims.

I claim:

1. A lockout arrangement for a foldable agricultural implement having a set of ground engaging tools, the implement having a frame member with at least one frame section foldable between an extended position and a transport position, comprising:
    a valve arrangement operatively connected to the at least one frame section and being movable between a first configuration and a second configuration wherein the at least one frame section is maintained in the transport position, the configuration of the valve arrangement allowing for movement of the frame section between the extended position and the transport position;
    a rotating member pivotably connected to the frame member and operatively connected to the valve arrangement such that pivotable movement of the rotating member with respect to the frame member adjusts a configuration of the valve arrangement;
    an elongated member having a first end and a second end, the first end of the elongated member coupled to the frame section of the agricultural implement; and
    a pin attached at the second end of the elongated member and being moveable between a first position wherein the rotating member of the agricultural implement is free to pivot on the frame member and a second position wherein the pin engages and prevents the pivoting of the rotation of the rotating member and maintains the valve arrangement in the second configuration;
    wherein the elongated member is a cable that moves toward the rotating member in response to rotation of the frame section in a first rotational direction and moves away from the rotating member in response to rotation of the frame section in a second rotational direction.

2. The lockout arrangement of claim 1, wherein the pin is configured to be inserted into an open end of the rotating member when the frame section rotates in the first rotational direction.

3. The lockout arrangement of claim 2 wherein the rotating member is a rockshaft having a tubular member and at least one arm coupled to the tubular member extending along an elongated axis and wherein the at least one arm defines an axis of rotation for the rockshaft that is parallel to and offset from the elongated axis such that the tubular member moves along a radial arc with an origin defined by the axis of rotation, and wherein the pin, when engaged with the rockshaft, prevents the rockshaft from moving along the radial arc.

4. The lockout arrangement of claim 3 further comprising a bushing mounted to the implement and having an annular body defining an annular passage that aligns with the opening formed in the open end of the rockshaft when the implement is in the folded, transport position, and wherein the annular passage guides the pin into engagement with the rockshaft.

5. An agricultural implement comprising:
    a frame having at least two frame sections foldable between an extended position and folded position, each frame section including a plurality of ground engaging tools movable between an elevated position and a ground engaging position;
    a hydraulic system operative to fold and unfold the frame sections and to move the plurality of ground engaging tools between the elevated position and the ground engaging position;
    a valve arrangement operatively connected to the hydraulic system for controlling a flow of hydraulic fluid to the hydraulic system, the valve arrangement being movable between a first configuration and a second configuration wherein the plurality of ground engaging tools are maintained in the elevated position;

a rockshaft pivotably coupled to the frame and operatively connected to the valve arrangement, wherein rotation of the rockshaft varies the flow of hydraulic fluid to the hydraulic system so as to allow for a selective movement of the plurality of ground engaging tools to the ground engaging position; and a lockout that prevents rotation of the rockshaft and maintains the valve arrangement in the second configuration when the frame sections are in the folded position;

wherein the lockout includes an elongated member having a first end coupled to the frame and a second end adapted to engage the rockshaft when the rockshaft when the frame sections are in the folded position and disengaged the rockshaft when the frame sections are in the extended position;

wherein the elongated member is a cable.

6. The implement of claim 5 wherein the first end of the elongated member is bolted to the frame such that the elongated member translates in response to rotation of the frame, and wherein the second end is guided by a flange mounted to the frame adjacent the rockshaft.

7. The implement of claim 6 further comprising a pin at the second end of the elongated member, the pin having a rigid body defined by a leading end that engages the rockshaft when the frame sections are in the folded position and a trailing end that is supported by the flange.

8. The implement of claim 7 wherein the rockshaft has a tubular member and at least one arm coupled to the tubular member extending along an elongated axis and wherein the at least one arm defines an axis of rotation for the rockshaft that is parallel to and offset from the elongated axis such that the tubular member moves along a longitudinal axis with an origin defined by the axis of rotation, and wherein the pin, when engaged with the rockshaft, prevents the rockshaft from moving along the longitudinal axis.

9. The implement of claim 8 further comprising a bushing mounted to the frame adjacent the rockshaft and wherein the pin passes through the bushing when engaging the rockshaft.

10. A method preventing unintentionally lowering of the frame of a foldable farm implement when the implement is in a folded, transport position, the method comprising:

translating a locking member with rotation of the frame from an unfolded position to the folded, transport position;

engaging the locking member having a push-pull cable and a sliding pin; the sliding pin attached to an end of the push-pull cable adjacent to a rockshaft coupled to the frame when the frame is in the folded, transport position, wherein the rockshaft, when rotated, allows a plurality of row units mounted to the implement to pivot about an axis that is transverse to a longitudinal axis of the implement; and maintaining the engagement of the locking member with the rockshaft until the frame is placed in the unfolded position.

11. The method of claim 10 wherein the locking member is an elongated cable having a first end attached to a rotatable portion of the frame and a second end having a pin adapted to engage an open end of the rockshaft, and further comprising inserting the pin into the open end of the rockshaft when the rotatable portion of the frame is rotated from a substantially horizontal position to a fully rotated position.

12. The method of claim 11 wherein the fully rotated position is about 90 degrees from the substantially horizontal position.

13. The method of claim 11 further comprising supporting the pin adjacent the open end of the rockshaft.

14. The method of claim 11 wherein the foldable farm implement is a hoe drill.

\* \* \* \* \*